(12) United States Patent
Shi et al.

(10) Patent No.: US 9,563,921 B2
(45) Date of Patent: Feb. 7, 2017

(54) SYSTEM AND METHOD FOR DETECTING MERCHANT POINTS OF COMPROMISE USING NETWORK ANALYSIS AND MODELING

(71) Applicant: Opera Solutions, LLC, Jersey City, NJ (US)

(72) Inventors: Lei Shi, San Diego, CA (US);
Chengwei Huang, Shanghai (CN);
Jeong-Yoon Lee, Torrance, CA (US);
Weiqiang Wang, San Diego, CA (US);
Jenny Zhang, San Diego, CA (US);
Yonghui Chen, San Diego, CA (US)

(73) Assignee: Opera Solutions U.S.A., LLC, Jersey City, NJ (US)

( * ) Notice: Subject to any disclaimer, the term of this patent is extended or adjusted under 35 U.S.C. 154(b) by 223 days.

(21) Appl. No.: 14/206,114

(22) Filed: Mar. 12, 2014

(65) Prior Publication Data
US 2014/0279306 A1    Sep. 18, 2014

Related U.S. Application Data

(60) Provisional application No. 61/778,866, filed on Mar. 13, 2013.

(51) Int. Cl.
*G06Q 40/00*    (2012.01)

(52) U.S. Cl.
CPC .................................. *G06Q 40/12* (2013.12)

(58) Field of Classification Search
None
See application file for complete search history.

(56) References Cited

U.S. PATENT DOCUMENTS 5,819,226 A * 10/1998 Gopinathan ........... G06Q 20/00
    705/44
7,562,814 B1 * 7/2009 Shao ..................... G06F 21/552
    235/375

* cited by examiner

*Primary Examiner* — Paul Danneman
(74) *Attorney, Agent, or Firm* — McCarter & English, LLP

(57) ABSTRACT

Provided is a system for detecting a merchant point of compromise. More specifically, provided is a system for detecting a merchant point of compromise comprising a computer system in electronic communication with a transaction processing network containing transaction information, the computer system comprising a point-of-compromise detector, said point-of-compromise detector performing the steps of electronically receiving from the transaction processing network the transaction information; generating at least one of an undirected network or a directed network based on the transaction information; extracting features from the at least one of the undirected network or the directed network; and identifying one or more point-of-compromise merchants based on the extracted features.

24 Claims, 5 Drawing Sheets

SYSTEM AND METHOD FOR DETECTING MERCHANT POINTS OF COMPROMISE USING NETWORK ANALYSIS AND MODELING

CROSS-REFERENCE TO RELATED APPLICATIONS

This application claims priority under 35 U.S.C. §119(e) to U.S. Provisional Patent Application No. 61/778,866, filed on Mar. 13, 2013, the entire disclosure of which is expressly incorporated herein by reference.

BACKGROUND OF THE INVENTION

Field of the Invention

The present invention relates generally to systems for detecting points of compromise of accounts to identify fraudulent transactions, and more specifically, to a system and method for detecting merchant points of compromise using network analysis and modeling.

Related Art

It is estimated that credit card compromise fraud loss is over two billion dollars per year in the United States. Issuers, acquirers, and/or network associations have tried numerous ways to identify and detect credit card compromise fraud loss early. Conventionally, a group of rules for the authorization of transactions are applied in order to generate corresponding alerts. In some of the conventional approaches to credit card compromise detection, the relationship between different fraud transactions can be analyzed.

Recently, there has much research using network analysis in the field of fraud detection, such as anti-money laundering activities or assets and auto insurance fraud detection. This network analysis approach has had some success in identifying "hidden" relationships between different items in the fraud network. While network analysis has shown to be a promising tool in early identification and detection of fraud in some environments, there remains a need to further develop more robust and efficient approaches to detecting merchant points of compromise.

SUMMARY OF THE INVENTION

The present invention relates to a system and method for detecting merchant points of compromise (POC) using network analysis and modeling. The system can use the relationship between transactions associated with POCs and non-POCs to detect POC merchants by building undirected transaction networks and directed transaction networks for the merchants. Using graph theory and analysis, unique features can be extracted to represent POCs and a model can be created to automatically detect suspicious compromise merchants. The system of the present disclosure can be used as an individual POC detecting model and/or can be used to improve performance of existing POC models. Advantageously, the system can be implemented with or without a set of transaction authorization rules. The system can be advantageously implemented in connection with a set or group of transactions to identify POC merchants, rather than having to consider each transaction individually. The same approach can be applied to breach of issuers or processors.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a system and method for detecting merchant points of compromise using network analysis and modeling, as discussed in detail below in connection with FIGS. 1-7.

The system of the present disclosure can be implemented using graph theory and network analysis to, for example, detect point of compromise (POC) merchants (e.g., a merchant at which an account is compromised). The system can use a relationship between transactions associated with POCs and non-POCs to detect POC merchants by building undirected transaction networks and/or directed transaction networks for the merchants. Using graph theory and analysis, unique features can be extracted to represent POCs and a model can be created that can be used to automatically detect suspicious compromise merchants.

The system can build a suspicious merchant network with associated fraud transactions as an undirected network and/or can build a network of merchants including suspicious and non-suspicious merchants as a directed graph. In the undirected suspicious merchant network, the suspicious merchants can be represented as nodes and the relationships (links or connections) between the suspicious merchants (i.e., nodes) can be represented as edges, which can be defined using similarity functions. In the directed merchant network, the merchants (e.g., suspicious and non-suspicious merchants) can be represented as nodes and the merchants (i.e., nodes) can be connected by edges if an account is used for purchases at the merchants consecutively. The undirected and/or directed networks that are formed can be analyzed using graph theory and unique features can be extracted from the networks to represent a POC related network. A classification model can be used to detect POCs in the POC related network. The system of the present disclosure can successfully detect POCs as an independent application and/or can be implemented to improve the performance of conventional POC detecting methods.

While the system utilizes undirected and directed network graphs in a graphical form (e.g., FIGS. 2 and 3), those skilled in the art will recognize that the network graphs define a relationship between objects, things, and/or events, and that the system of the present disclosure can utilize the network graphs in any suitable form. For example, the network graphs can be represented using one or more data structures or files, such as a text file, spreadsheet, database hierarchy, an eXtensible Mark-up Language (XML) file, a HyperText Mark-up Language (HTML) file, and/or any other suitable data structure or file.

Figure 1:
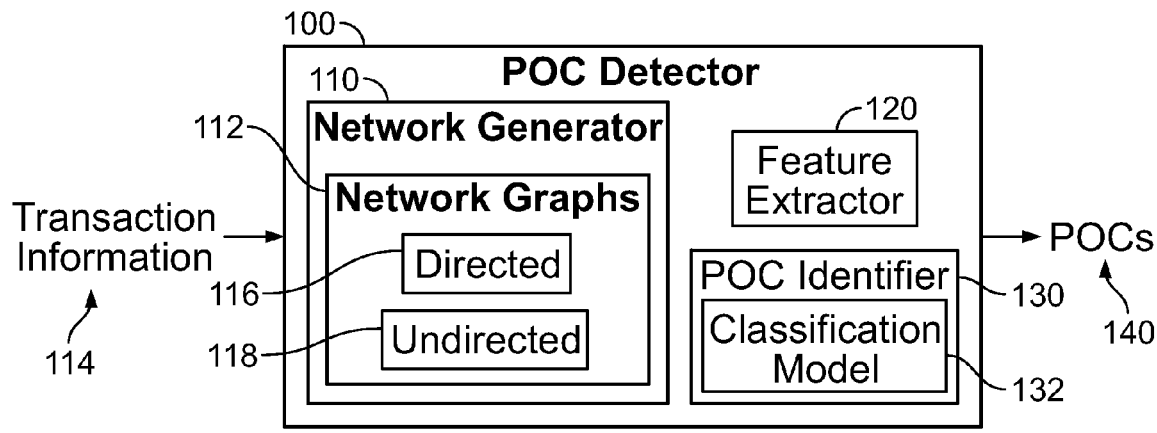
FIG. 1 is a block diagram of a point-of-compromise (POC) detection system in accordance with the present disclosure.
Figure 7:
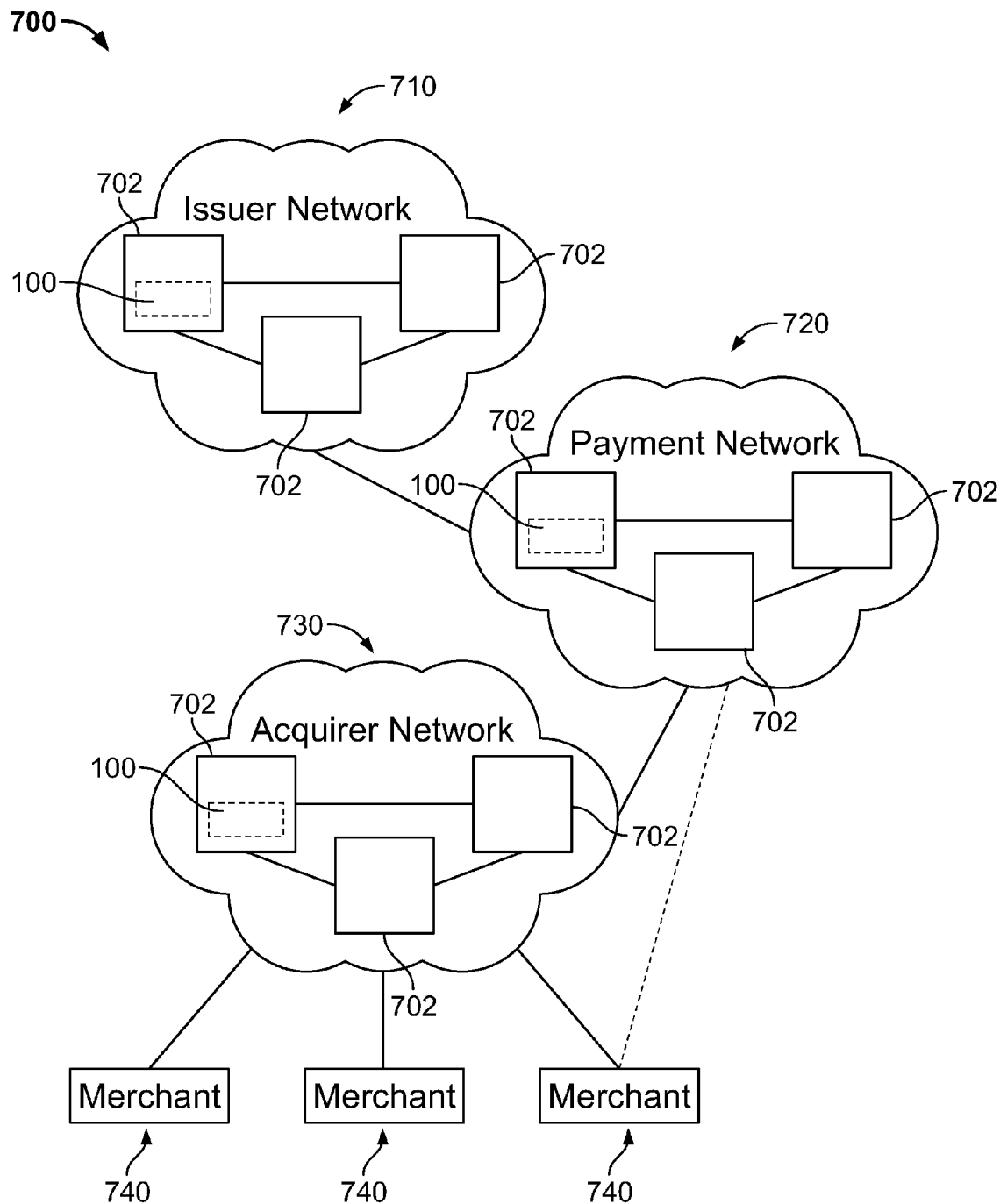
FIG. 7 is a diagram showing a sample transaction processing environment in which the system of the present disclosure could be implemented.

FIG. 1 is a block diagram of a point-of-compromise (POC) detector 100 in accordance with the present invention which includes a network graph generator 110, a feature extractor 120, and a POC identifier 130 in accordance with the present disclosure. The detector 100 can be programmed and/or configured to implement one or more POC detection processes to detect POC merchants (e.g., a merchant at which the fraud occurs) for one or more accounts (e.g., a customer credit/debit card account used at the merchant) using a relationship between account transactions at different merchants and information about the transactions and merchants. The detector 100 can be implemented to monitor account transactions in a transaction processing network. An exemplary transaction processing network is shown in FIG. 7, and discussed below in greater detail. The detector 100 can be implemented to operate automatically without user intervention and/or can be implemented to operate in response to a request from a user. In some embodiments, the detector 100 can be implemented to continuously and/or periodically monitor account transactions in a transaction processing network.

The generator 110 can be programmed and/or coded to create one or more network graphs 112 based on transaction information 114. For example, the generator 110 can be programmed and/or coded to create one or more directed network graphs 116 having edges with directional information connecting nodes and/or one or more undirected network graphs 118 having edges without directional information connecting nodes. The nodes can represent specific transactions associated with one or more accounts and/or can represent merchants. The edges between the nodes can represent a relationship between the nodes, which can be determined from the transaction information 114.

The transaction information 114 can be stored in one or more databases and/or can be streamed or otherwise provided to the detector 110. In the system, the transaction information 114 can include, for example, a purchase date and time, a purchase amount, a merchant name, merchant category code (MCC), a bank identification number (BIN), a merchant location (including street number, address, city, state, country, uniform resource locator, and/or the like), and/or can include any other suitable information about a transaction.

The generator 110 can be programmed and/or configured to create an undirected graph that includes nodes that represent first fraud transactions associated with accounts having pre-fraud transactions in a common merchant. The nodes of the undirected graph can be programmatically connected by undirected edges based on a relationship between the transactions. For example, an edge can connect a pair of nodes together if each account associated with a corresponding first fraud transaction is suspected of being compromised in the same merchant (e.g., the fraud transactions are tagged with the same merchant ID). The generator 110 can assign a weight to an edge based on the similarity of two nodes that are connected by the edge. The generator 110 can estimate the similarity by summing similarity variables in transaction information. Some examples of similarity values can include a merchant category code (MCC), transaction (purchase) amount, time of transaction, time speed, zip code in which the transaction occurred, and/or any other suitable values included in the transaction information. The weights of the edges can be used by the feature extractor 120 when extracting one or more features from a network graph.

The generator 110 can be programmed and/or configured to create a directed graph that includes nodes that represent merchants. The nodes of the directed graph can be programmatically connected by directed edges based on a relationship between the transactions occurring at the merchants. For example, an edge can connect a pair of nodes together if an account with fraud transaction history is used at consecutive merchants to perform transactions such that each directed edge indicates there is at least one account that has consecutive transactions in the merchants connected by the directed edge. The generator 110 can assign a weight to the directed edge based on a number of accounts that have consecutive purchases in the merchants connected by the edge. The weights of the edges can be used by the feature extractor 120 when extracting one or more features from a network graph.

The feature extractor 120 can be programmed and/or configured to extract features (graph variables) from the one or more network graphs 112 created by the generator 110. The features programmatically extracted from the one or more network graphs 112 can include information about the one or more network graphs 112, which can be obtained directly and/or indirectly from the one or more network graphs 112. The features extracted from the undirected graphs 116 can be different than the features extracted from the directed graph. For example, some exemplary features that can be extracted by extractor 120 from an undirected graph are provided in Table 1 and some exemplary features that can be extracted by the extractor 120 from a directed graph are provided in Table 2.

TABLE 1

Exemplary features extracted from an undirected graph.

| Features | Description |
| --- | --- |
| Number of Nodes | The number of nodes in the network denoted as $|V|$, where V represents the set of nodes in the network. |
| Number of Edges | The number of edges in the network denoted as $|E|$, where E represents the set of edges in the network. |
| Graph Density | Graph density: $D = \frac{2|E|}{|V||V-1|}$, where D represents the density. |
| Degree statistics | These features are calculated from the degree of vertexes in the graph. A degree is defined as the number of partners for a node. The mean, variance, median and maximum of degrees are chosen as features. |
| Edge weight statistics | Like degree statistics, the mean, variance, median, and maximum of weights are chosen as features. |
| Diameter | Diameter is the longest geodesic length of any two nodes in the graph. |
| Topological change | This group of features is gained by measuring the topological changes when different cutoffs of the weights are applied to the graph. Topological changes are measured as $T_i = (|E_i| - |E_{i+1}|)/|E_i|$ where $E_i$ is the number of edges with different cutoffs i and $T_i$ is the topological change with cutoff i. |
| Clustering coefficient | Clustering coefficient is a measure of degree to which nodes in a graph tend to cluster together. This feature is calculated by $C = \frac{2t}{q(q-1)}$, where q is the number of neighbors and t is the number of links connecting the q neighboring nodes. The mean, variance, and maximum of clustering coefficients are chosen as features. |
| Topological coefficient | Topological coefficient is a relative measure of the extent to which a node shares interaction partners with other nodes. It reflects the number of rectangles that pass through a node. |

TABLE 1-continued

Exemplary features extracted from an undirected graph.

| Features | Description |
|---|---|
| | The mean, variance, median, and maximum of topological coefficients are chosen as features. |

TABLE 2

Exemplary features extracted from a directed graph.

| Features | Description |
|---|---|
| Page rank (PR) | $PR(u) = \frac{1-d}{N} + d \frac{\sum_{v \in B(u)} PR(v)}{N_v}$, where u represents a node; d is a dampening factor that is usually set to 0:85; B(u) is the set of nodes that point to u; PR(u) and PR(v) are rank scores of node u and v, respectively; $N_v$ denotes the number of outgoing edges of node v; and N is the number of nodes in the network. |
| Degree centrality | The number of connected neighbor nodes. All, out and in degrees are chosen as features. |
| Closeness centrality | Closeness centrality measures how many steps are required to access every other nodes from a given node in the network. All, out and in closeness are used as features here. |
| Betweenness centrality | The number of geodesics (shortest paths) going through the node in the given network. |
| Eigenvector centrality | Eigenvector centrality measures the influence of a node in a network. It assigns relative scores to all nodes in the network based on the concept that connections to high-scoring nodes contribute more to the score of the node in question than equal connections to low-scoring nodes. |

The POC identifier 130 can be programmed and/or configured to identify a POC based on the one or more network graphs generated by the generator 110 and/or the features from the one or more network graphs extracted by the extractor 120. The POC identifier 130 can be programmed and/or configured to utilize a classification model 132 that classifies a merchant as a POC merchant or a non-POC merchant. In the system, the classification model 132 can utilize a generalized linear model or other suitable classification model to predict whether a merchant is a point of compromise for the features that are extracted from the one or more network graphs and outputs POCs 140. The features extracted from the network graph can be used as input variables of the generalized linear model. Every merchant can be a training example with multiple network features as inputs, and a compromise tag as the target (either 0 or 1). The model's weights are set by the automatic training process.

Figure 2:
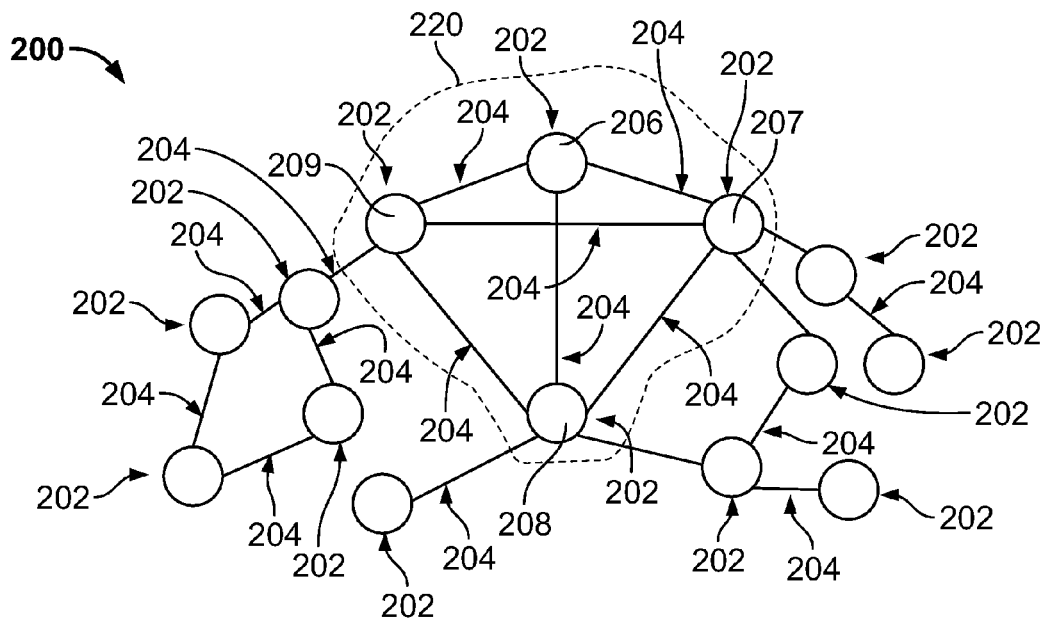
FIG. 2 is an exemplary undirected network graph that can be generated by the system of the present disclosure.

FIG. 2 shows an exemplary undirected network graph 200 that can be generated by the generator 110. The graph 200 includes nodes 202 and undirected edges 204. Each of the nodes 202 represent a first suspected fraud transactions associated with an account. For example, the node 206 represents a first suspected fraud transaction from a first account, the node 207 represents a first suspected fraud transaction from a second account, the node 208 represents a first suspected fraud transaction from a third account, and the node 209 represents a first suspected fraud transaction from a fourth account.

The nodes can be generated from the transaction information 114, which can correspond to, for example, transaction information received from one or more transaction processing networks, such as, for example, a credit card transaction processing network. The edges 204 connecting the nodes 202 represent a relationship between the nodes 202 extracted from the transaction information 114. For example, in the system, the nodes 202 can be connected if the accounts associated with the nodes 202 are suspected of being compromised in the same merchant (e.g., fraudulent transactions having the same merchant ID).

A sub-network 220 can be identified within the undirected graph 200 when a group of the nodes 202 are suspected of being comprised in the same merchant. As shown in graph 200, each of the nodes 206-209 are connected to each other by one of the edges 204 forming the sub-network 220 to indicate that the accounts associated with the nodes 206-209 are suspected of being compromised in the same merchant. The sub-networks of the graph 200 can be used to identify one or more points of compromise by the detector 100.

Figure 3:
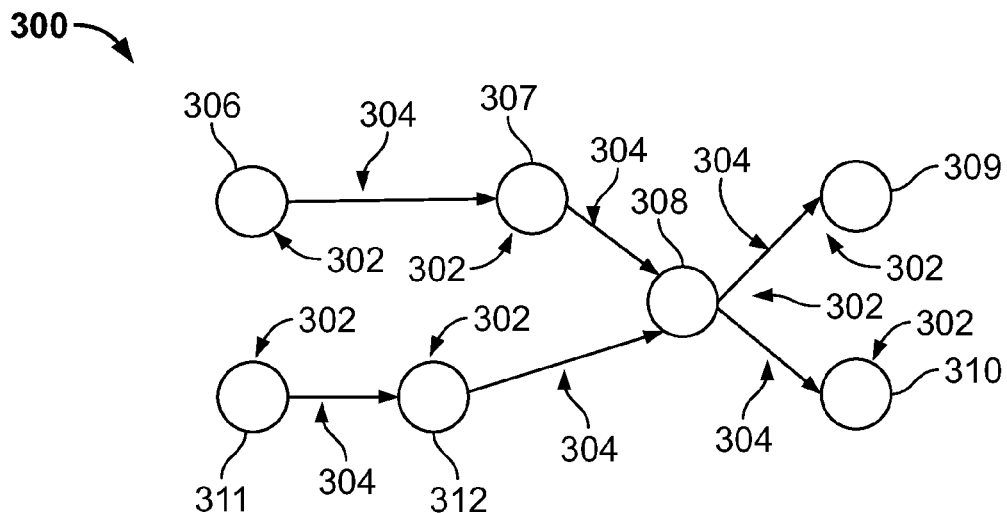
FIG. 3 is an exemplary directed network graph that can be generated by the system of the present disclosure.

FIG. 3 shows an exemplary directed network graph 300 that can be generated by an embodiment of the generator 110. The graph 300 includes nodes 302 and directed edges 304. Each of the nodes 302 represent a merchant (e.g., a merchant participating in a transaction processing network). For example, the node 306 represents a first merchant, the node 307 represents a second merchant, the node 308 (e.g., a compromise merchant) represents a third merchant, the node 309 represents a fourth merchant, the node 310 represents a fifth merchant, the node 311 (e.g., a fraud merchant) represents a sixth merchant, and the node 312 (e.g., a fraud merchant) represents a seventh merchant.

The nodes 302 can be connected to each other by one of the edges 304 when consecutive purchases by the same account are made at the merchants (e.g., without any intervening purchases made between the merchants). For example, in the present embodiment, node 306 is connected to node 307 by one of the edges 304 to indicate that an account was used at the merchant represented by node 306 and consecutively was used at the merchant represented by node 307, and node 307 is connected to node 308 by one of the edges 304 to indicate that an account was used at the merchant represented by node 307 and consecutively was used at the merchant represented by node 308. Likewise, node 311 is connected to node 312 by one of the edges 304 to indicate that an account was used at the merchant represented by node 311 and consecutively was used at the merchant represented by node 312, node 312 is connected to node 308 by one of the edges 304 to indicate that an account was used at the merchant represented by node 312 and consecutively was used at the merchant represented by node 308. The node 308 is connected to each of the nodes 309 and 310 by one of the edges 304 to indicate that an account was used at the merchant represented by node 308 and consecutively was used at the merchants represented by nodes 309 and 310.

A POC can process many pre-fraud transactions. To start, all fraud transactions are traced back to common purchase points (CPPs). Some CPPs are compromise merchants and some CPPs are large merchants (e.g., Wal-Mart, Target). In the present embodiment, by tracking back historical fraud merchants, exemplary embodiments of the present disclosure can identify suspicious POCs based on network features. While not all convergence of edges to single node indicate a POC, a POC will generally have this property. Likewise, not all divergence from a single node indicates subsequent fraud merchants, but fraud merchants will generally come after compromised merchants (e.g., node 308).

As shown in FIG. 3, the nodes 306, 307, 311, and 312 represent legitimate merchants before the account(s) are compromised and the node 308 represents a point-of-comprise (POC) merchant. The nodes 309 and 310, which are downstream from the POC, represent possible fraud merchants (e.g., some of the merchants are just big merchants like Target).

Figure 4:
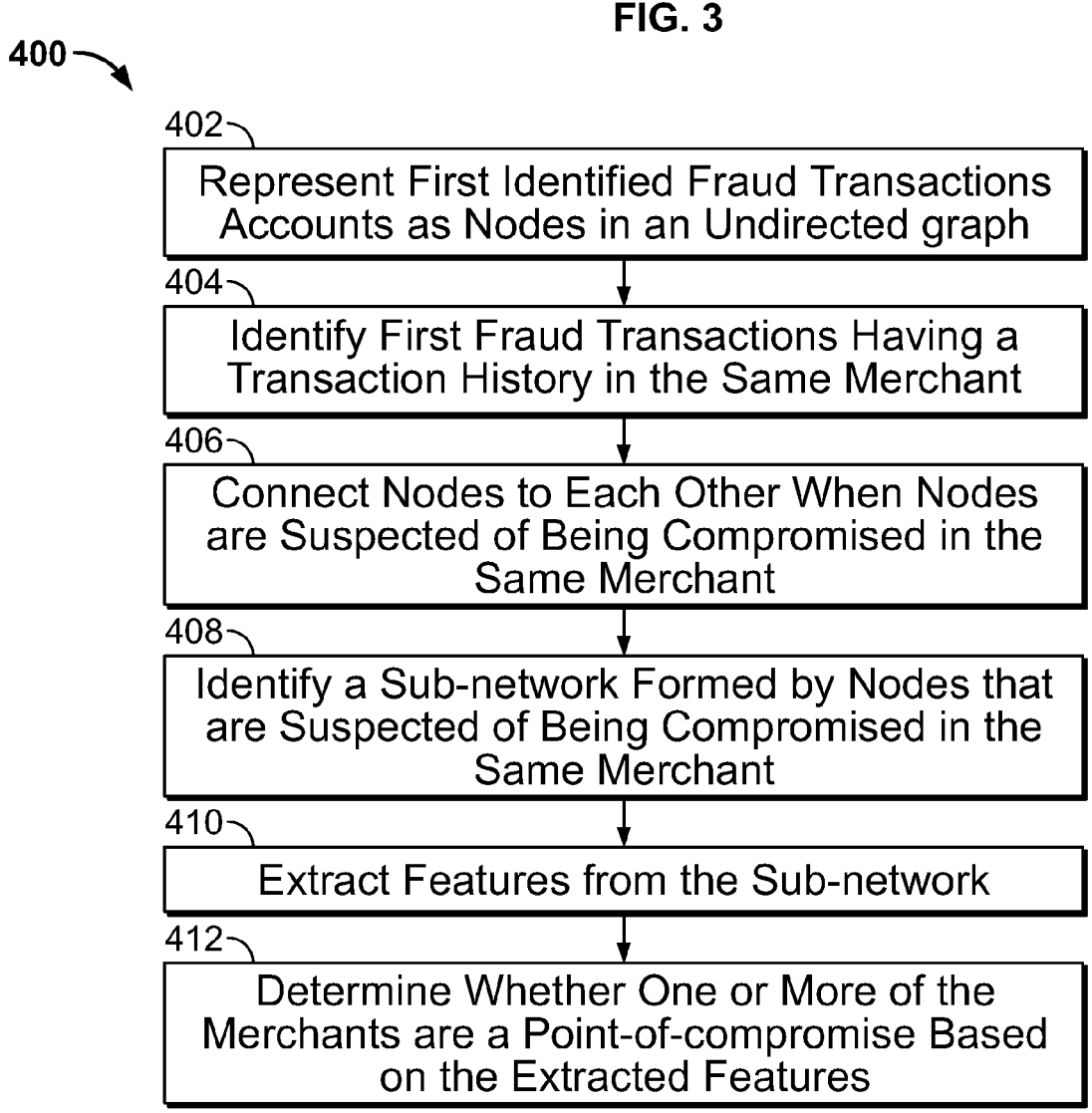
FIG. 4 is a flowchart showing overall processing steps carried out by the system of the present disclosure.

FIG. 4 is flowchart showing overall processing steps 400 of an exemplary embodiment of the POC detection process carried out by the detector 100 of the present disclosure. Beginning in step 402, the detector can programmatically represent first identified fraud transactions having transaction history in a same merchant as nodes in an undirected graph. In step 404, the detector 100 can programmatically identify first fraud transaction having transaction history in a same merchant using the transaction information associated with the first fraud transactions. For example, the transaction information for each transaction can include a merchant identifier, a merchant name, a merchant location, and/or any other information that can be utilized to identify a merchant associated with the transaction.

In step 406, when the detector identifies fraud transactions that correspond to the same merchant based on the transaction information, the detector 100 connects the nodes with an undirected edge to indicate that the nodes are suspected of being compromised in the same merchant (e.g., fraudulent transactions having the same merchant ID). The weight of an edge can correspond to a similarity of the nodes that are connected by the edge and can be used by the feature extractor 120 when extracting one or more features from a network graph. The similarity can be estimated by a sum of the similarity variables. Some examples of similarity variables that can be summed to determine the similarity between nodes include, but are not limited to MCC, amount, time, time speed, and zip code.

In step 408, a sub-network formed by nodes that are suspected of being compromised in the same merchant can be identified by the detector 100. In step 410, features (graph variables) can be extracted from the sub-network for one or more merchants. In step 412, the detector 100 utilizes a classification model to determine whether one or more of the merchants are a point-of-compromise based on the extracted features.

Figure 5:
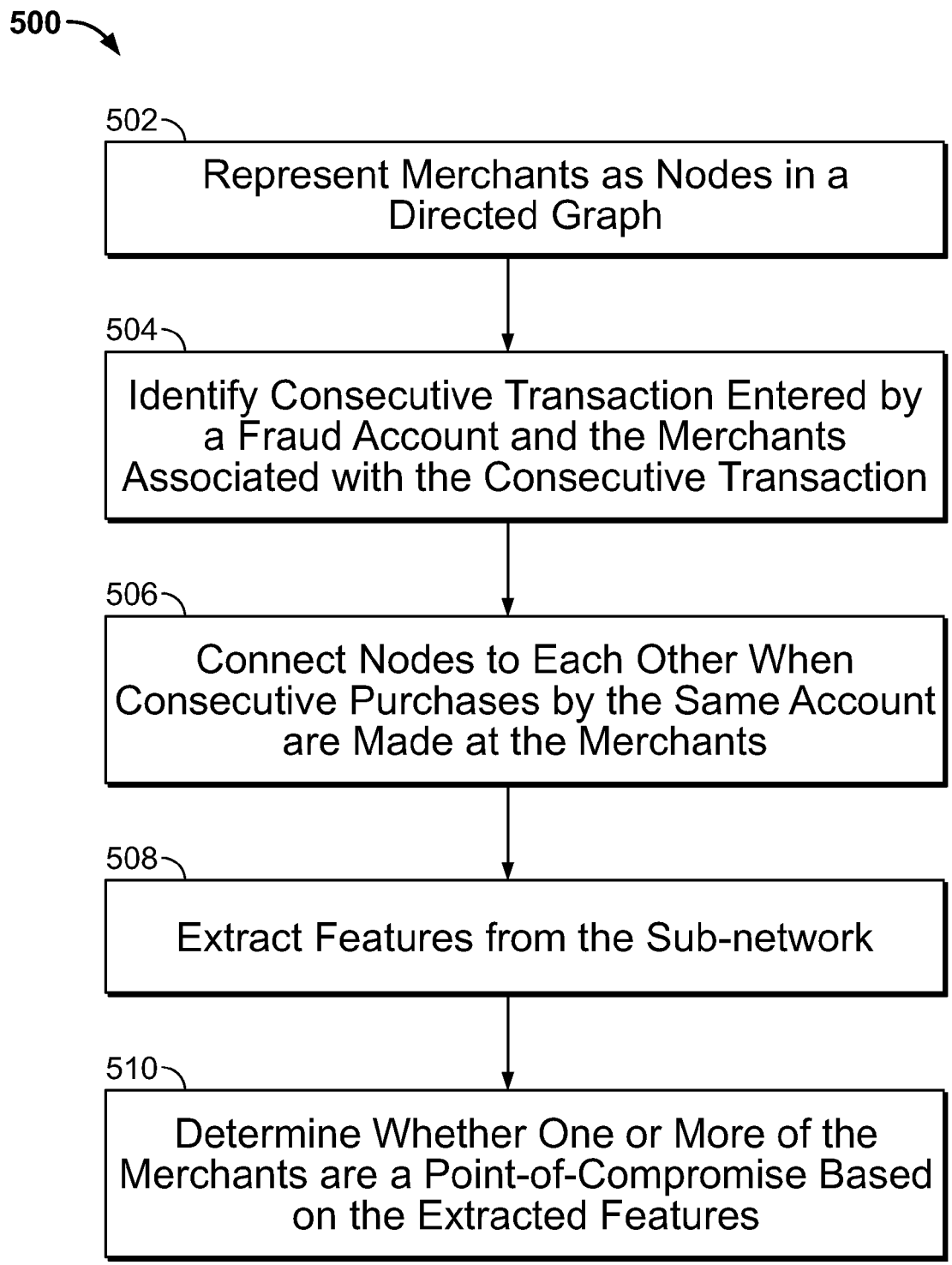
FIG. 5 is a flowchart showing overall processing steps carried out by another embodiment of the system of the present disclosure.

FIG. 5 is flowchart showing overall processing steps 500 of another exemplary embodiment of the POC detection process carried out by the detector 100 of the present disclosure. Beginning in step 502, the detector can programmatically represent merchants as nodes in a directed graph. In step 504, the detector identifies consecutive transactions made by a fraud account (i.e., transaction made without any intervening transactions) and identifies the merchants associated with the consecutive transactions. In step 506, when the detector 100 identifies consecutive purchases by the same account are made at the merchants, the detector 100 can connected the nodes representing the merchants to each other using a directed edges to indicate the order in which the consecutive transactions occurred. After an account is compromised in a POC, fraud transactions can occur in other merchants. The weight of a directed edge can correspond to the number of accounts who have consecutive purchases in the two merchants connected by the directed edge and can be used by the feature extractor 120 when extracting one or more features from a network graph. In step 508, graph features or parameters can be extracted from the network for the merchants. In step 510, the detector 100 utilizes a classification model to determine whether one or more of the merchants are a point-of-compromise based on the extracted features.

Figure 6:
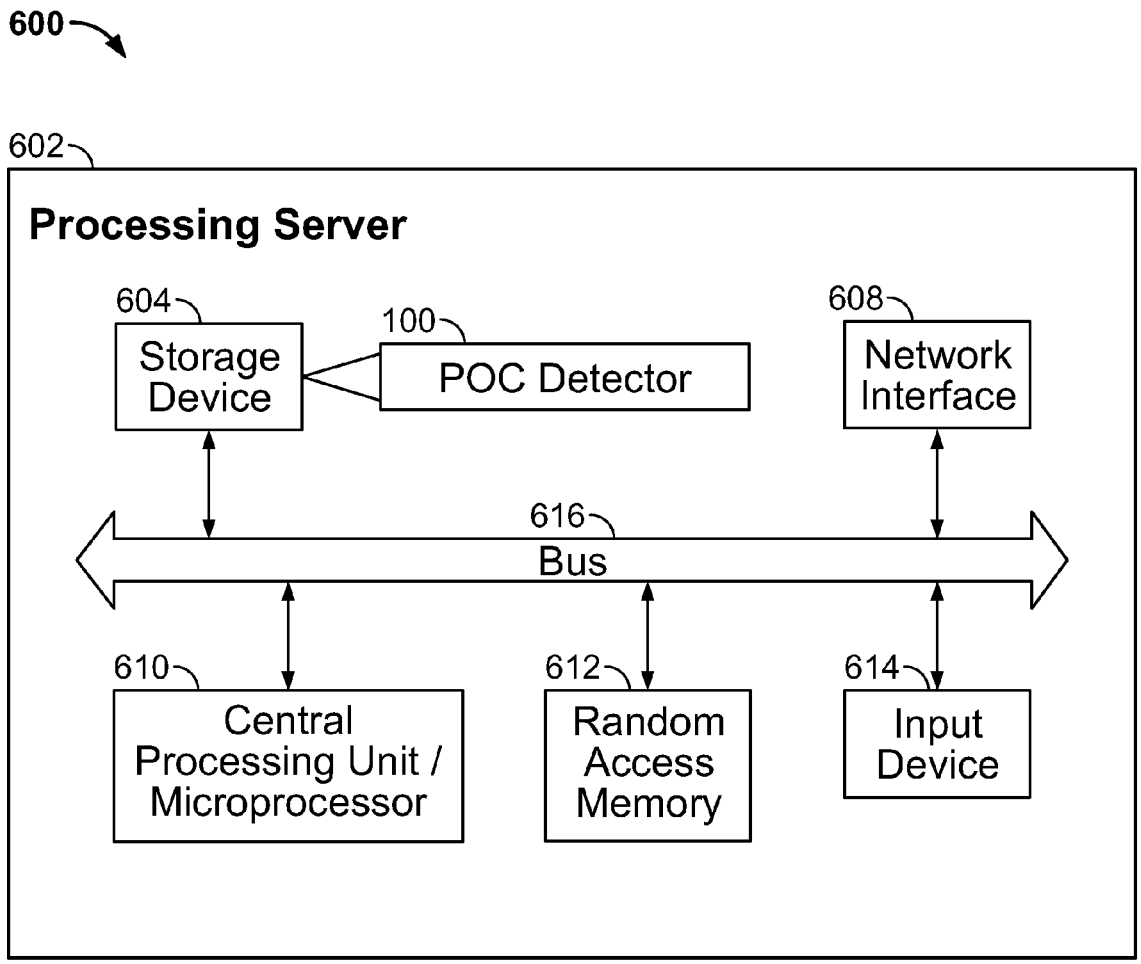
FIG. 6 is a diagram showing hardware and software components of the system of the present disclosure.

FIG. 6 is a diagram showing hardware and software components of an exemplary system 600 capable of performing the processes discussed above. The system 600 includes a processing server 602, e.g., a computer, and the like, which can include a storage device 604, a network interface 608, a communications bus 616, a central processing unit (CPU) 610, e.g., a microprocessor, and the like, a random access memory (RAM) 612, and one or more input devices 614, e.g., a keyboard, a mouse, and the like. The processing server 602 can also include a display, e.g., a liquid crystal display (LCD), a cathode ray tube (CRT), and the like. The storage device 604 can include any suitable, computer-readable storage medium, e.g., a disk, non-volatile memory, read-only memory (ROM), erasable programmable ROM (EPROM), electrically-erasable programmable ROM (EEPROM), flash memory, field-programmable gate array (FPGA), and the like. The processing server 602 can be, e.g., a networked computer system, a personal computer, a smart phone, a tablet, and the like.

The detector 100, or portions thereof, can be embodied as computer-readable program code stored on one or more non-transitory computer-readable storage device 604 and can be executed by the CPU 610 using any suitable, high or low level computing language, such as, e.g., Java, C, C++, C#, .NET, and the like. Execution of the computer-readable code by the CPU 610 can cause the detector 100 to implement embodiments of one or more point-of-compromise (POC) detection processes. The network interface 608 can include, e.g., an Ethernet network interface device, a wireless network interface device, any other suitable device which permits the processing server 602 to communicate via the network, and the like. The CPU 610 can include any suitable single- or multiple-core microprocessor of any suitable architecture that is capable of implementing and/or running the detector 100, e.g., an Intel processor, and the like. The random access memory 612 can include any suitable, high-speed, random access memory typical of most modern computers, such as, e.g., dynamic RAM (DRAM), and the like.

FIG. 7 shows an exemplary transaction processing environment 700, in which an embodiment of the detector 100 can be implemented. The transaction processing environment 700 can include an issuer network 710, a payment network 720, an acquirer network 730, and merchant systems 740. The transaction processing environment 700 can be configured to process credit and/or debit account transactions. The networks 710, 720, and 730 can each include one or more computing devices 702, which can be implemented by the system of the computing device 600 and/or can be implemented as servers, switches, routers, and/or any other suitable electronic devices.

The issuer network 710 can correspond to the entity that provides an account to a user/consumer. The issuer can be, for example, a financial institution, such as a bank and/or credit union. The issuer network 710 can be operatively coupled to the other networks in the environment 700 to facilitate credit/debit transactions and can include computing devices for processing, tracking, and storing transactions entered by account holders at merchants (e.g., via transaction information received through the payment network 720).

The payment network 720 can be an intermediary network between the merchant systems 740 and the issuer network 710. The payment network 720 can provide a network that routes transaction information received from the merchants systems 740 (e.g., via the acquirer network 730) to the appropriate issuer network 710 for processing of the transaction using the transaction information. The payment network can include one or more computing devices configured to route transaction information to the appropriate issuer based on for example a bank identification number (BIN) included in the transaction information. In the system, the at least some of the computing devices in the payment network 720 can be routers having one or more routing tables that govern how a transaction is routed through the payment network 720.

The acquirer network 730 can be an intermediary network between the merchant systems 740 and the payment network 720. The acquirer network 720 can provide a network that routes transaction information received from the merchants systems 740 to the appropriate payment network 720 for processing of the transaction using the transaction information. The acquirer network 730 can include one or more computing devices configured to route transaction information to the appropriate payment network 720 based on for example a payment network identification number included in the transaction information. In the system, the at least some of the computing devices in the acquirer network 730 can be routers having one or more routing tables that govern how a transaction is routed through the acquirer network 730. While the present embodiment includes an acquirer network, those skilled in the art will recognize that the merchant systems 740 may communicate with the payment network 720 without passing through the acquirer network 730.

Merchants systems 740 can be in communication with the issuer network 710 via the acquirer network 730 and/or the payment network 720. The merchant systems 740 can each correspond to a merchant and can include, for example, point-of-sale terminals, servers, and/or any other computing devices to facilitate a credit/debit transaction. In the system, an account holder can purchase one or more items from one or more merchants through the merchant systems 740 and the transaction information can be routed to the issuer network 710 to be processed.

The system of the detector 100 can be implemented at one or more locations in the environment to facilitate detection of points of comprise in the environment 700. For example, in the system, the detector 100 can be implemented by one or more computing device in the issuer network 710, the payment network 720, the acquirer network 730, and/or the merchant systems 740.

Having thus described the invention in detail, it is to be understood that the foregoing description is not intended to limit the spirit or scope thereof. It will be understood that the embodiments of the present invention described herein are merely exemplary and that a person skilled in the art may make any variations and modification without departing from the spirit and scope of the invention. All such variations and modifications, including those discussed above, are intended to be included within the scope of the invention. What is desired to be protected by Letters Patent is set forth in the following claims.

What is claimed is:

1. A system for detecting a merchant point of compromise, the system comprising:
   a point of sale terminal located at a merchant location;
   at least one of an issuer network, a payment network, and an acquirer network communicating with the point of sale terminal, each of said issuer network, said payment network, and said acquirer network including a server, a switch, or a router; and
   a point-of-compromise detector installed in a computer system forming part of the issuer network, the payment network, or the acquirer network, said point-of-compromise detector being implemented at one or more of the issuer network, the payment network, and the acquirer network, said point-of-compromise detector remote from the point of sale terminal and configured to remotely detect fraud occurring at the point of sale terminal by:
   electronically receiving the transaction information from the point of sale terminal;
   generating at least one of an undirected network or a directed network based on the transaction information;
   creating a plurality of nodes in the directed network, wherein each of the nodes represents a merchant;
   detecting consecutive transactions made by a fraud account;
   identifying a plurality of merchants associated with the consecutive transactions;
   connecting at least two of the plurality of nodes in the directed network by edges that represent the plurality of merchants associated with the consecutive transactions;
   assigning weights to the edges based on numbers of accounts associated with the consecutive transactions;
   extracting features from at least one of the undirected network or the directed network; and
   identifying one or more point-of-compromise merchants based on the extracted features.

2. The system of claim 1, wherein the point-of-compromise detector creates a classification model having the extracted features as input variables, and uses the classification model for classifying a merchant as a point-of-compromise merchant or as a non-point-of-compromise merchant.

3. The system of claim 1, wherein the generating step comprises generating an undirected network based on establishing a plurality of nodes associated with a plurality of accounts, each node indicating a first suspected fraud transaction associated with an account of the plurality of accounts; and establishing a plurality of undirected edges, each undirected edge connecting a pair of nodes of the plurality of nodes based on the point-of-compromise detector determining that both nodes for each pair of nodes have first suspected fraud transactions associated with a common merchant.

4. The system of claim 3, wherein generating the undirected network comprises summing similarity variables in the transaction information to estimate a similarity value for a pair of nodes connected by an undirected edge, and assigning a weight to the undirected edge based on the similarity value.

5. The system of claim 4, wherein the weight of the undirected edge is used by the point-of-compromise detector to perform the step of extracting features.

6. The system of claim 5, wherein each directed edge indicates an order in which the consecutive transactions occurred.

7. The system of claim 6, wherein the weight of the first directed edge is used by the point-of-compromise detector to perform the step of extracting features.

8. The system of claim 3, wherein the point-of-compromise detector further performs the step of identifying within the undirected network a sub-network comprising a subset of nodes of the plurality of nodes, the subset of nodes indicating accounts suspected of being compromised in the common merchant.

9. A method for detecting a merchant point of compromise, comprising the steps of:
   providing a point of sale terminal located at a merchant location;

providing at least one of an issuer network, a payment network, and an acquirer network communicating with the point of sale terminal, each of said issuer network, said payment network, and said acquirer network including a server, a switch, or a router;

installing a point-of-compromise detector in a computer system forming part of the issuer network, the payment network, or the acquirer network;

implementing said point-of-compromise detector remote from the point of sale terminal at one or more of the issuer network, the payment network, and the acquirer network;

configuring said point-of-compromise detector to remotely detect fraud occurring at the point of sale terminal;

electronically receiving, at a point-of-compromise detector of a computer system, transaction information from the point of sale terminal;

generating, by the point-of-compromise detector, at least one of an undirected network or a directed network based on the transaction information;

creating a plurality of nodes in the directed network, wherein each of the nodes represents a merchant;

detecting consecutive transactions made by a fraud account;

identifying a plurality of merchants associated with the consecutive transactions;

connecting at least two of the plurality of nodes in the directed network by edges that represent the plurality of merchants associated with the consecutive transactions;

assigning weights to the edges based on numbers of accounts associated with the consecutive transactions;

extracting, by the point-of-compromise detector, features from at least one of the undirected network or the directed network; and identifying, by the point-of-compromise detector, one or more point-of-compromise merchants based on the extracted features.

10. The method of claim 9, further comprising the steps of generating a classification model having the extracted features as input variables, and using the classification model for classifying a merchant as a point-of-compromise merchant or as a non-point-of-compromise merchant.

11. The method of claim 9, wherein the generating step comprises generating an undirected network based on establishing a plurality of nodes associated with a plurality of accounts, each node indicating a first suspected fraud transaction associated with an account of the plurality of accounts; and establishing a plurality of undirected edges, each undirected edge connecting a pair of nodes of the plurality of nodes based on the point-of-compromise detector determining that both nodes for each pair of nodes have first suspected fraud transactions associated with a common merchant.

12. The method of claim 11, wherein generating the undirected network further comprises summing similarity variables in the transaction information to estimate a similarity value of a pair of nodes connected by an undirected edge, and assigning a weight to the undirected edge based on the similarity value.

13. The method of claim 12, wherein the weight of the undirected edge is used by the point-of-compromise detector to perform the step of extracting features.

14. The method of claim 13, wherein the directed edges indicate an order in which the consecutive transactions occurred.

15. The method of claim 14, wherein the weight of the first directed edge is used by the point-of-compromise detector to perform the step of extracting features.

16. The method of claim 11, further comprising the step of identifying within the undirected network a sub-network comprising a subset of nodes of the plurality of nodes, the subset of nodes indicating accounts suspected of being compromised in the common merchant.

17. A computer-readable medium having computer-readable instructions stored thereon which, when executed by a point-of-compromise detector of the computer system, cause the point-of-compromise detector to perform the steps of:

providing a point of sale terminal located at a merchant location;

providing at least one of an issuer network, a payment network, and an acquirer network communicating with the point of sale terminal, each of said issuer network, said payment network, and said acquirer network including a server, a switch, or a router;

installing a point-of-compromise detector in a computer system forming part of the issuer network, the payment network, or the acquirer network;

implementing said point-of-compromise detector remote from the point of sale terminal at one or more of the issuer network, the payment network, and the acquirer network;

configuring said point-of-compromise detector to remotely detect fraud occurring at the point of sale terminal;

electronically receiving transaction information from the point of sale terminal;

generating at least one of an undirected network or a directed network based on the transaction information;

creating a plurality of nodes in the directed network, wherein each of the nodes represents a merchant;

detecting consecutive transactions made by a fraud account;

identifying a plurality of merchants associated with the consecutive transactions;

connecting at least two of the plurality of nodes in the directed network by edges that represent the plurality of merchants associated with the consecutive transactions;

assigning weights to the edges based on numbers of accounts associated with the consecutive transactions;

extracting features from at least one of the undirected network or the directed network; and identifying one or more point-of-compromise merchants based on the extracted features.

18. The computer-readable medium of claim 17, which, when executed by the point-of-compromise detector, cause the point-of-compromise detector to perform the steps of generating a classification model having the extracted features as input variables, and using the classification model for classifying a merchant as a point-of-compromise merchant or as a non-point-of-compromise merchant.

19. The computer-readable medium of claim 17, wherein the generating step comprises generating an undirected network based on establishing a plurality of nodes associated with a plurality of accounts, each node indicating a first suspected fraud transaction associated with an account of the plurality of accounts; and establishing a plurality of undirected edges, each undirected edge connecting a pair of nodes of the plurality of nodes based on the point-of-compromise detector determining that both nodes for each pair of nodes have first suspected fraud transactions associated with a common merchant.

20. The computer-readable medium of claim 19, wherein generating the undirected network comprises summing similarity variables in the transaction information to estimate a similarity value of a pair of nodes connected by an undirected edge, and assigning a weight to the undirected edge based on the similarity value.

21. The computer-readable medium of claim 20, which further cause the point-of-compromise detector to use the weight of the undirected edge to perform the step of extracting features.

22. The computer-readable medium of claim 21, wherein the directed edges indicate an order in which the consecutive transactions occurred.

23. The computer-readable medium of claim 22, which further cause the point-of-compromise detector to use the weight of the first directed edge to perform the step of extracting features.

24. The computer-readable medium of claim 19, which, when executed by the point-of-compromise detector, cause the point-of-compromise detector to further perform the step of identifying within the undirected network a sub-network comprising a subset of nodes of the plurality of nodes, the subset of nodes indicating accounts suspected of being compromised in the common merchant.

* * * * *

UNITED STATES PATENT AND TRADEMARK OFFICE
CERTIFICATE OF CORRECTION

PATENT NO. : 9,563,921 B2  Page 1 of 1
APPLICATION NO. : 14/206114
DATED : February 7, 2017
INVENTOR(S) : Lei Shi et al.

It is certified that error appears in the above-identified patent and that said Letters Patent is hereby corrected as shown below:

On the Title Page

The Applicant (Item (71)) should be listed as "Opera Solutions U.S.A., LLC, Jersey City, NJ (US)"

In the Specification

In Column 7, Line 52, the word "connected" should be deleted and replaced with "connect"

In Column 7, Line 53, the word "a" should be deleted

Signed and Sealed this
Fifth Day of September, 2017

Joseph Matal
*Performing the Functions and Duties of the*
*Under Secretary of Commerce for Intellectual Property and*
*Director of the United States Patent and Trademark Office*